United States Patent
Takemoto et al.

(10) Patent No.: US 8,786,161 B2
(45) Date of Patent: Jul. 22, 2014

(54) SENSORLESS MOTOR AND PUMP HAVING A CONSEQUENT ROTOR

(75) Inventors: Yoshiaki Takemoto, Toyohashi (JP); Toshihiro Uchida, Nagoya (JP); Seiya Yokoyama, Toyohashi (JP); Shigemasa Kato, Toyohashi (JP)

(73) Assignee: ASMO Co., Ltd., Kosai-Shi, Shizuoka-Ken (JP)

( * ) Notice: Subject to any disclaimer, the term of this patent is extended or adjusted under 35 U.S.C. 154(b) by 78 days.

(21) Appl. No.: 13/431,784

(22) Filed: Mar. 27, 2012

(65) Prior Publication Data

US 2012/0248919 A1 Oct. 4, 2012

(30) Foreign Application Priority Data

Mar. 30, 2011 (JP) ................................. 2011-075526
Mar. 1, 2012 (JP) ................................. 2012-045693

(51) Int. Cl.
*H02K 1/27* (2006.01)
*H02K 1/24* (2006.01)

(52) U.S. Cl.
USPC ................. 310/263; 310/156.53; 310/156.56; 310/269

(58) Field of Classification Search
CPC ... H02K 1/276; H02K 1/2766; H02K 1/2773; H02K 21/044
USPC ................................. 310/156.53, 156.56, 263
IPC ................................................ H02K 1/24, 1/27
See application file for complete search history.

(56) References Cited

U.S. PATENT DOCUMENTS

| 6,127,764 A * | 10/2000 | Torok .............................. 310/269 |
| 8,324,779 B2 * | 12/2012 | Kato et al. ................ 310/156.57 |
| 2008/0036331 A1 * | 2/2008 | Mizutani et al. ............... 310/269 |
| 2010/0072929 A1 * | 3/2010 | Tomigashi ............... 318/400.21 |
| 2010/0148612 A1 | 6/2010 | Takemoto et al. |
| 2010/0166579 A1 * | 7/2010 | Noh et al. ................... 417/423.7 |
| 2010/0308680 A1 * | 12/2010 | Yamada et al. ........... 310/156.54 |
| 2011/0181230 A1 * | 7/2011 | Yamada et al. ................ 318/724 |
| 2013/0113323 A1 * | 5/2013 | Yamada et al. ........... 310/156.07 |

FOREIGN PATENT DOCUMENTS

JP 2010-263763 11/2010

OTHER PUBLICATIONS

U.S. Appl. No. 13/274,064, filed Oct. 14, 2011.

* cited by examiner

*Primary Examiner* — Terrance Kenerly
(74) *Attorney, Agent, or Firm* — Workman Nydegger

(57) ABSTRACT

A motor in which drive current supplied to a winding is controlled in accordance with a rotational position of a rotor detected from a waveform of an induced voltage between phases. The motor is provided with a stator including 3×n teeth and windings for three phases. A rotor includes a rotor core, an n number of magnets, and an n number of salient poles. The magnets function as one of the magnetic poles, the salient poles function as the other one of the magnetic poles. Each salient pole is spaced apart by a gap from the adjacent ones of the magnets in the circumferential direction. The magnets and gap are arranged inward in the radial direction from the rotor core. An electrical angle between two ends of each magnet is set to be smaller than an electrical angle between two ends of each salient pole.

4 Claims, 6 Drawing Sheets

SENSORLESS MOTOR AND PUMP HAVING A CONSEQUENT ROTOR

CROSS REFERENCE TO RELATED APPLICATIONS

This application claims priority to Japanese Patent Application No. 2011-075526, filed on Mar. 30, 2011, and Japanese Patent Application No. 2012-045693, filed on Mar. 1, 2012, the entireties of which are incorporated herein by reference.

BACKGROUND OF THE INVENTION

The present invention relates to a motor and electric pump that use a consequent pole type rotor.

Japanese Laid-Open Patent Publication No. 2010-263763 describes a motor using a so-called consequent pole type rotor. The motor includes a stator having twelve slots and a rotor having eight magnetic poles. The rotor includes a rotor core having four salient poles and four magnets (neodymium magnets) embedded in the rotor core in the circumferential direction of the rotor core. The four magnets function as one of the magnetic poles. The four salient poles are arranged between adjacent ones of the four magnets and function as the other one of the magnetic poles. A motor using such a consequent pole type rotor or a driving device for an electric pump or the like using such a motor obtains higher output with a smaller and lighter structure and reduces costs.

Another type of motor employs a sensorless driving technique. The motor controls the drive current supplied to a stator based on a waveform of an induced voltage, that is, a control signal having the waveform of the induced voltage, without using a rotation sensor. However, in a motor using the consequent pole type rotor that embeds magnets in the rotor core, stable induced voltage cannot be obtained when the rotor starts to rotate. That is, a certain period of time is necessary until the induced voltage becomes stable. Thus, time is required before starting the execution of a control based on the induced voltage.

Further, in a motor that uses a consequent pole type rotor, the waveform of the induced voltage is irregular as compared with a normal motor that does not include salient poles and includes eight magnets forming eight magnetic poles. Thus, it is difficult to employ the sensorless driving technique in a motor that employs a consequent pole type rotor.

Figure 6:
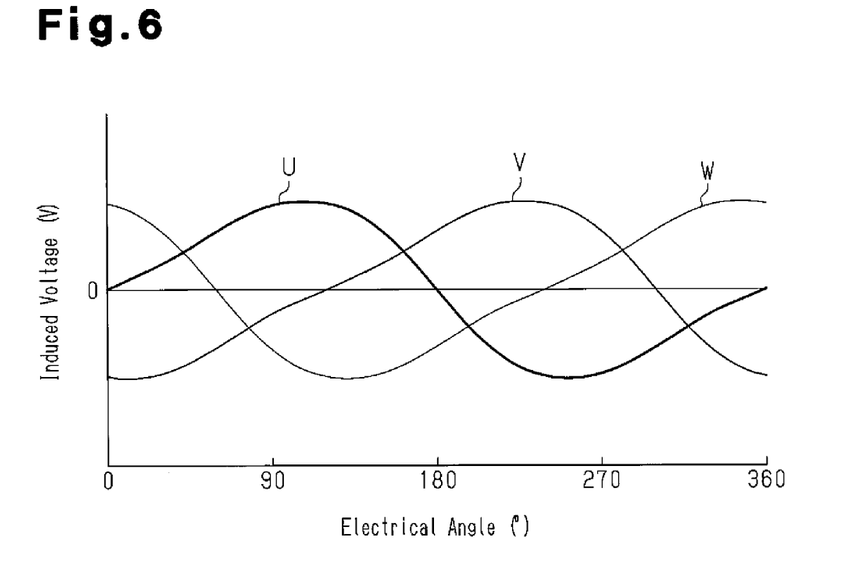
FIG. 6 is an electric angle-induced voltage waveform diagram for a motor of the prior art.
Figure 7:
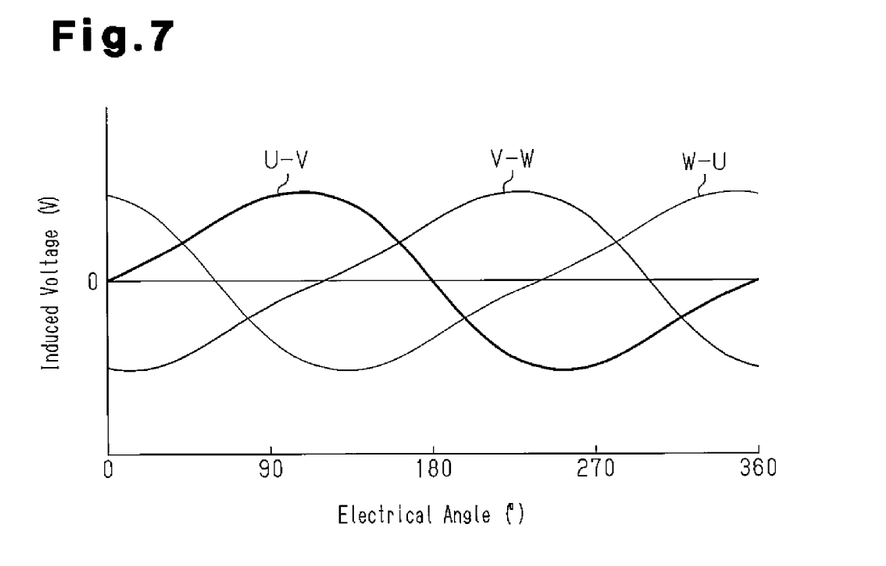
FIG. 7 is an electric angle-induced voltage waveform diagram for a motor of the prior art.
Figure 8:
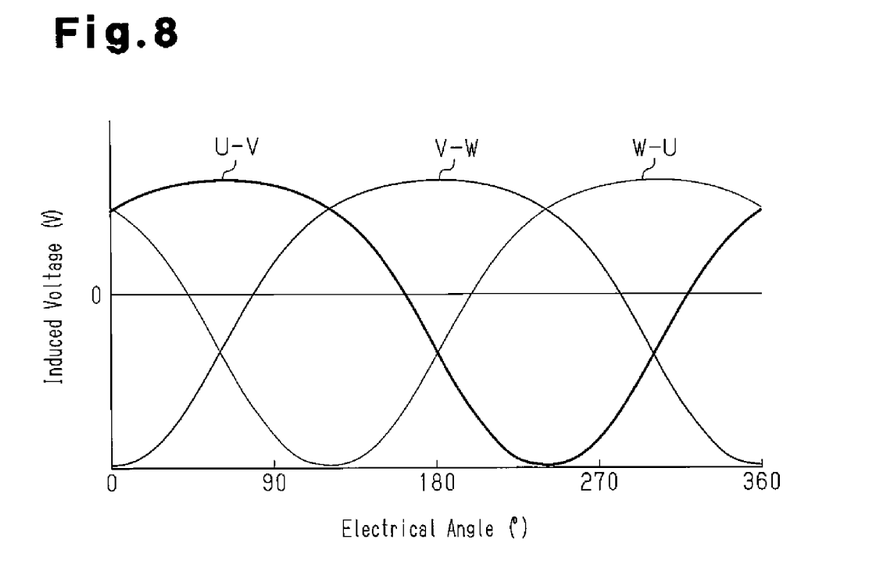
FIG. 8 is an electric angle-induced voltage waveform diagram for a motor of the prior art.

More specifically, in a normal motor, the distortion rate with respect to a sine wave is 1.3% and small in a waveform of the induced voltage for each phase. This allows for satisfactory employment of the sensorless driving technique. In contrast, FIG. 6 shows the waveform of the induced voltage for each phase (U phase, V phase, and W phase) of a motor that uses a consequent pole type rotor in which the electrical angle is equal (for example, 27° in mechanical angle) between the two ends of one magnetic pole (magnetic pole of the magnet) and the other magnetic pole (magnetic pole of the salient pole). In such a motor, as shown in FIG. 6, the distortion rate with respect to a sine wave is 21.1%. Further, in a Y-connection motor using a similar consequent pole type rotor, the waveform of the induced voltage between terminals (U-V, V-W, and W-U) becomes irregular as shown in FIG. 7. In a delta-connection motor using a similar consequent pole type rotor, the waveform of the induced voltage between terminals (U-V, V-W, and W-U) becomes irregular as shown in FIG. 8. It is considered that the waveforms become irregular as shown in FIGS. 7 and 8 because the magnetic poles of salient poles do not generate a forcible magnetic pole flow like the magnetic poles of magnets.

Further, in the waveforms of FIGS. 6 to 8, for example, the peaks are deviated from normal positions. More specifically, the peak interval is approximately 110° where it should be 90°. In addition, the waveform is asymmetric relative to each peak. It is difficult to use induced voltage having such an irregular waveform as a control signal. Thus, it is difficult to employ the sensorless driving technique for the control of a consequent pole type rotor.

SUMMARY OF THE INVENTION

It is an object of the present invention to provide a motor and an electric pump that allows for satisfactory employment of a sensorless driving technique.

One aspect of the present invention is a motor in which drive current supplied to a winding is controlled in accordance with a rotational position of a rotor detected from a waveform of an induced voltage between phases. The motor includes a stator and a rotor. The stator includes 3×n teeth and windings for three phases sequentially wound around the teeth. The teeth are arranged in a circumferential direction and extend inward in a radial direction, and slots are formed between adjacent ones of the teeth in the circumferential direction. The rotor includes a rotor core, which is arranged inward in the radial direction from the stator, an n number of magnets arranged in the circumferential direction of the rotor core, and an n number of salient poles arranged in the rotor core. The magnets function as one of the magnetic poles, the salient poles function as the other one of the magnetic poles, and each of the salient poles is spaced apart by a gap from the adjacent ones of the magnets in the circumferential direction. Here, n is a natural number. The magnets and the gap are arranged inward in the radial direction from an outer contour of the rotor core. An electrical angle between two ends of each magnet is set to be smaller than an electrical angle between two ends of each salient pole.

A further aspect of the present invention is an electric pump including the motor of the first aspect, a case that accommodates the motor, and an impeller rotated integrally with the rotor in the case.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be described with reference to FIGS. 1 to 5.

Figure 1A:
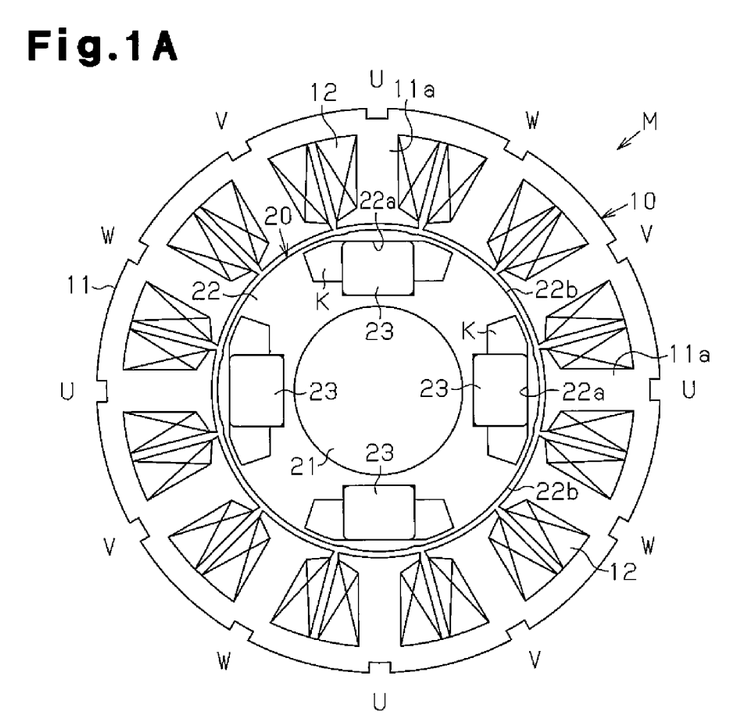
FIG. 1A is a plan view showing a motor according to one embodiment of the present invention.

Referring to FIG. 1A, an inner rotor type brushless motor M includes a stator 10. The stator 10 includes a stator core 11 and windings 12. The stator core 11 includes twelve teeth 11a, which are arranged in the circumferential direction of the stator 10. The windings 12 for three phases (U phase, V phase, and W phase) are sequentially wound around the teeth 11a. Accordingly, the stator 10 is a twelve-slot stator.

Figure 1B:
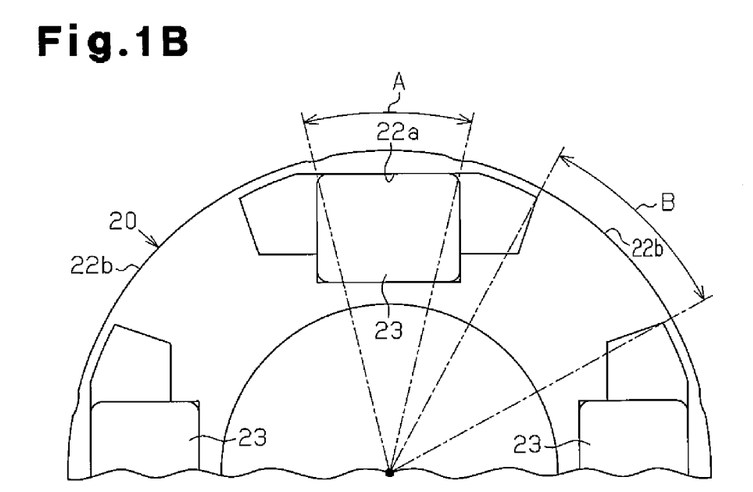
FIG. 1B is a partially enlarged plan view showing a rotor of FIG. 1A.

The motor M also includes a rotor 20 arranged at the inner side of the stator 10. As shown in FIGS. 1A and 1B, the rotor 20 includes a rotation shaft 21 and an annular rotor core 22, which is fitted onto the rotation shaft 21. The rotor core 22 has a peripheral portion near an outer peripheral surface. The peripheral portion includes four magnet accommodation holes 22a arranged at 90° intervals in the circumferential direction. Four N-pole magnets 23 are respectively arranged in the four magnet accommodation holes 22a.

The peripheral portion of the rotor core 22 also includes a plurality of salient poles 22b. Each salient pole 22b is spaced apart by a gap K from each magnet adjacent in the circumferential direction. Each gap K forms part of a magnet accommodation hole 22a. The two gaps K arranged on opposite sides of each salient pole 22b have the same (fixed) areas. More specifically, the two gaps K at opposite sides of each magnet 23 have symmetric shapes in the circumferential direction. That is, the two gaps K are line-symmetric relative to a line extending through the center of the magnet 23 in the radial direction. Each gap K is formed so that its cross-sectional area remains the same in the axial direction throughout the entire gap K. The magnets 23 and the gaps K are arranged inward in the radial direction from the outer contour (outer circumference) of the rotor core 22. The phrase of "arranged inward in the radial direction from the outer contour of the rotor core 22" refers to a state arranged inward in the radial direction from an outermost location of the rotor core 22 in the radial direction.

The centers of the magnets 23 and the salient poles 22b are alternately arranged at equal angular intervals of 45°. In this manner, the rotor 20 is a so-called consequent pole type rotor having eight-magnetic poles, namely, the magnets 23, each functioning as an N-pole serving as one of the magnetic poles, and the salient poles 22b, each functioning as an S-pole serving as the other one of the magnetic poles.

Referring to FIG. 1B, the rotor 20 of the present embodiment is formed so that the electrical angle (A) between the two ends of one of the magnetic poles (the magnetic pole of each magnet 23) is smaller than the electric angle (B) between the two ends of the other one of the magnetic poles (magnetic pole of each salient pole 22b).

When the electrical angle between the two ends of one of the magnetic poles (the magnetic pole of each magnet 23) is represented by A and the electric angle between the two ends of the other one of the magnetic poles (magnetic pole of each salient pole 22b) is represented by B, the rotor 20 is set to satisfy $A = (6.10 \times 10^{-3} \times B^2 - 8.69 \times 10^{-1} \times B + 1.14 \times 10^2) \pm 8\%$.

More specifically, A is set as 108° (mechanical angle of 27°), and B is set as 132° (mechanical angle of 33°).

In other words, A is set to satisfy $(6.10 \times 10^{-3} \times B^2 - 8.69 \times 10^{-1} \times B + 1.14 \times 10^2) \times 0.92 \leq A \leq (6.10 \times 10^{-3} \times B^2 - 8.69 \times 10^{-1} \times B + 1.14 \times 10^2) \leq 1.08$.

That is, the rotor 20 of the present embodiment is set to satisfy $0.92 \leq A/(6.10 \times 10^{-3} \times B^2 - 8.69 \times 10^{-1} \times B + 1.14 \times 10^2) \leq 1.08$.

The above equations are based on data obtained from experiment results. In detail, an approximate equation is obtained from a curve X of FIG. 3 obtained by plotting angles when the waveform is as shown in FIGS. 4 and 5. Then, a width (±8%) is added to the approximate equation. The width (±8%) is a value in which the waveform is regular (waveform that is the same or better) with respect to the waveform of an induced voltage for a normal motor, that is, a motor that does not include salient poles and forms all of the magnetic poles with all of the magnets, is added to the approximate equation.

Figure 3:
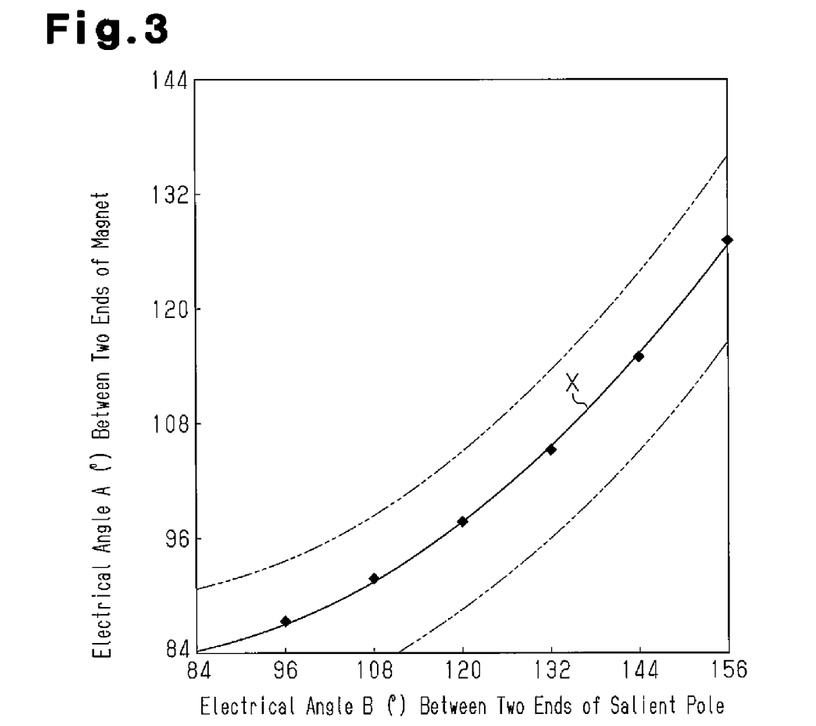
FIG. 3 is a graph showing the relationship, in a motor having a regular waveform, of the electric angle between the two ends of one magnetic pole and the electric angle between the two ends of the other magnetic pole.
Figure 4:
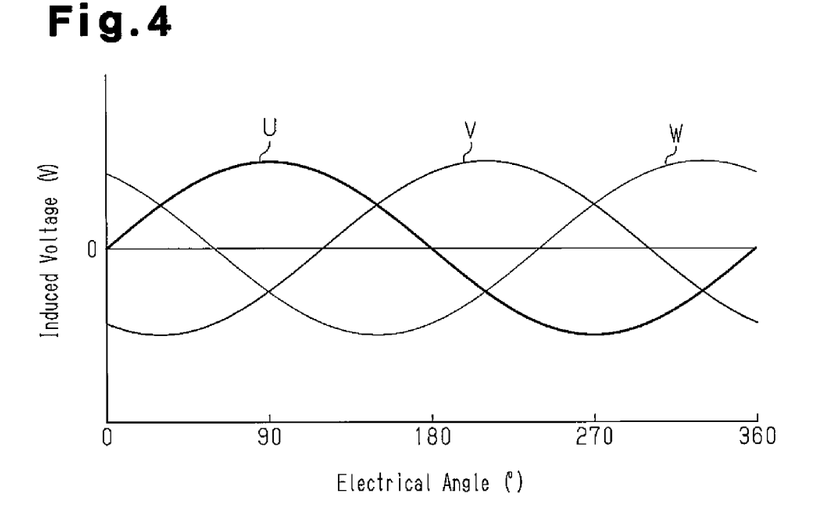
FIG. 4 is an electric angle-induced voltage waveform diagram for the motor of FIG. 1A.
Figure 5:
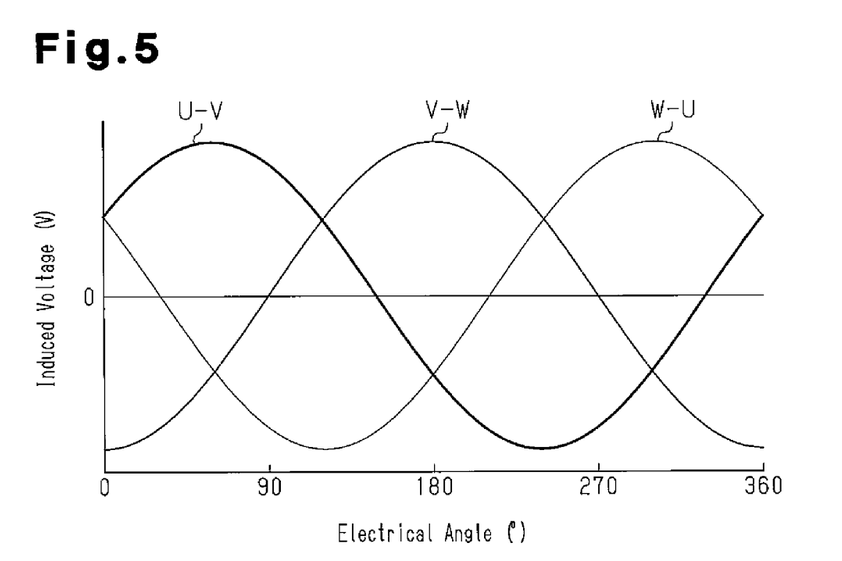
FIG. 5 is an electric angle-induced voltage waveform diagram for the motor of FIG. 1A.

When $A = 6.10 \times 10^{-3} \times B^2 - 8.69 \times 10^{-1} \times B + 1.14 \times 10^2$ is satisfied, that is, if the electrical angles A and B are included in curve X of FIG. 3, the waveform is as shown in FIGS. 4 and 5. When the electrical angles A and B are within the range of ±8%, the waveform is regular with respect to the waveform of an induced voltage in a normal motor. More specifically, the waveform is the same or better than the waveform of the induced voltage in a normal motor. That is, in the range between the double-dashed lines in FIG. 3, the distortion rate is 1.3% with respect to a sine wave of the induced voltage of a motor that does not include salient poles and forms all of the magnetic poles with all of the magnets. FIG. 4 shows the waveform of the induced voltage of each of the phases (U phase, V phase, and W phase) of the motor, which is included in curve X of FIG. 3, set to $A = 6.10 \times 10^{-3} \times B^2 - 8.69 \times 10^{-1} \times B + 1.14 \times 10^2$. In FIG. 4, the distortion rate is 0.9% with respect to the sine wave of the normal motor. FIG. 5 shows the waveform of the induced voltage between terminals (U-V, V-W, and W-U) of the motor (Y-connection and delta-connection), which is included in curve X of FIG. 3 and set to $A = 6.10 \times 10^{-3} \times B^2 - 8.69 \times 10^{-1} \times B + 1.14 \times 10^2$.

Figure 2:
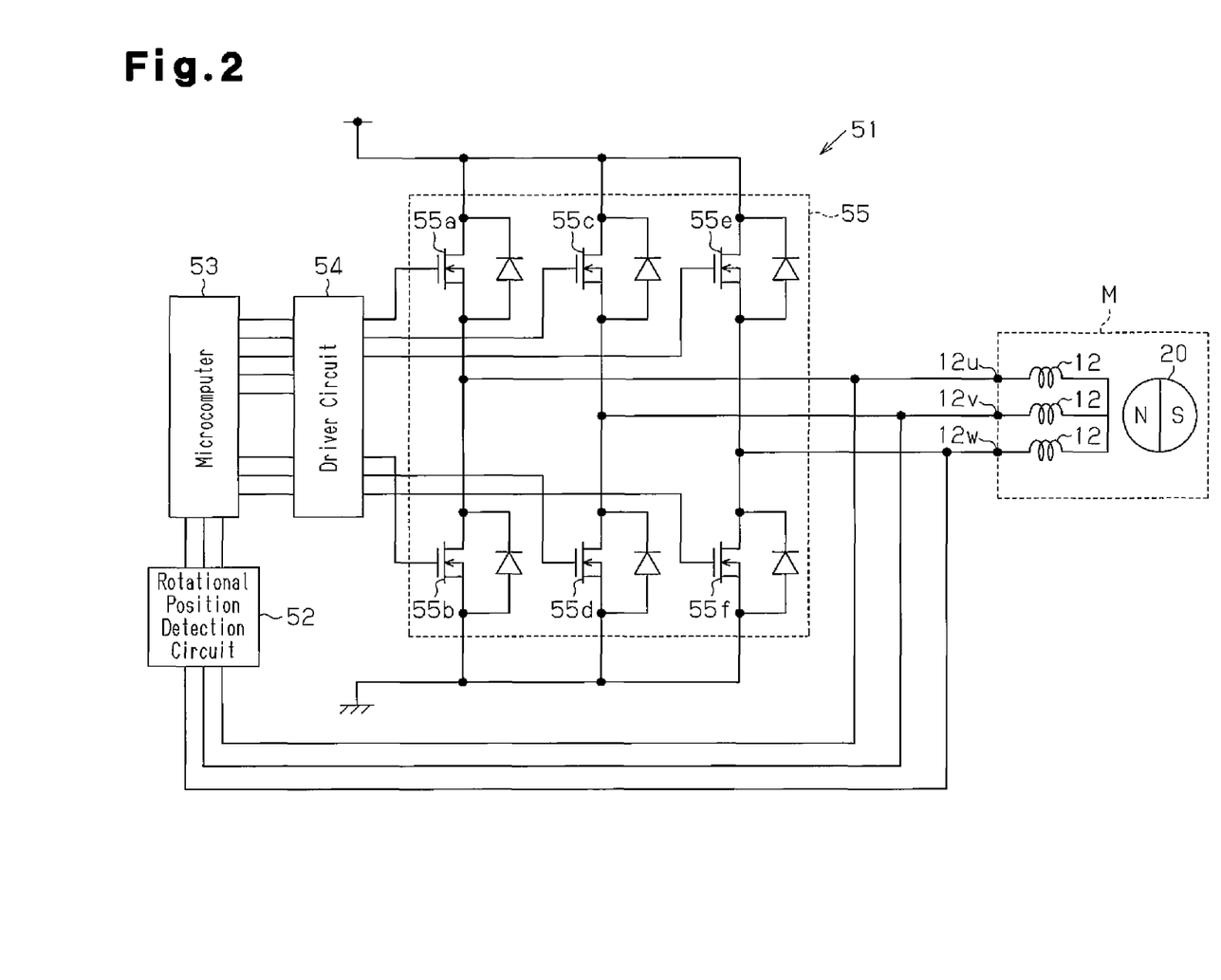
FIG. 2 is a circuit diagram of a controller for the motor of FIG. 1A.

As shown in FIG. 2, in the motor M, terminals 12u, 12v, and 12w of the windings 12 are connected to a controller 51, and the drive current supplied to the windings 12 of the stator 10 is controlled based on the waveform of the induced voltage as a control signal. In this manner, the motor M employs a sensorless driving technique. In detail, referring to FIG. 2, the controller 51 of the present embodiment includes a rotational position detection circuit 52 connected to the terminals 12u, 12v, and 12w of the windings 12. The rotational position detection circuit 52 detects the induced voltage induced to the winding 12 for each phase, generates a rotational position pulse signal corresponding to the rotational position of the rotor 20 based on the waveform of the induced voltage between the phases, and outputs the rotational position pulse signal to a microcomputer 53. The microcomputer 53 generates a commutation signal based on the received rotational position pulse signal and outputs the commutation signal via a driver circuit 54 to an inverter circuit 55. Switching control is executed on switching elements 55a to 55f by the commutation signal received by the inverter circuit 55. Further, the inverter circuit 55 performs a commutation operation that sequentially supplies the winding 12 of each phase with drive current.

The operation of the motor M will now be described.

When the rotor 20 starts to rotate, an induced voltage is generated in accordance with the rotation. Referring to FIG. 5, the controller 51 generates a rotational position pulse signal based on the waveform of the induced voltage between terminals (U-V, V-W, and W-U) as a control signal using the waveform of the induced voltage from, specifically, 0 V. A commutation signal is generated based on the rotational position pulsed signal, and the drive current supplied to the windings 12 is switched. The induced voltage generated in this state is not irregular. Thus, the rotor 20 undergoes satisfactory rotation control.

The above embodiment has the advantages described below.

(1) The number of teeth 11a is three times greater than the number of magnets 23. Thus, the magnets 23 always face the teeth 11a for the same one of the three phases (U phase, V phase, or W phase). Further, the electrical angle between one of the magnetic poles (magnets 23) is smaller than the electrical angle between the two ends of the other one of the magnetic poles (salient poles 22b). Thus, even though the magnets 23 and the gaps K are arranged inward from the outer contour of the rotor core 22, the attraction force of the magnets 23 acting on the teeth 11a is concentrated within a small range. This easily stops the rotor in a state in which the magnets 23 and the teeth 11a faces one another and increases the probability of rotation being started from the same position. Thus, stable induced voltage is easily obtained within a short period, and the time until starting a control using the induced voltage can be shortened in average.

(2) The electrical angle A between the two ends of one of the magnetic poles (the magnetic poles of the magnets 23) and the electrical angle B between the two ends of the other one of the magnetic poles (the magnetic poles of the salient poles 22b) are set to satisfy $A=(6.10\times10^{-3}\times B^2-8.69\times10^{-3}\times B+1.14\times10^2)\pm8\%$. Thus, experiment results stabilize the waveform of the induced voltage. More specifically, with the experiment result, the waveform of the induced voltage of the motor M using the consequent pole type rotor 20 is regular with respect to the waveform of the induced voltage of a motor that does not include the salient poles 22b and forms all of the magnetic poles with all of the magnets. That is, the waveform is the same as or better to the waveform of the induced voltage of the normal motor. As a result, in the motor M that uses the consequent pole type rotor 20, the sensorless driving technique can be used in a satisfactory manner, that is, with a torque characteristic that is similar to a normal motor.

It should be apparent to those skilled in the art that the present invention may be embodied in many other specific forms without departing from the spirit or scope of the invention. Particularly, it should be understood that the present invention may be embodied in the following forms.

Figure 9:
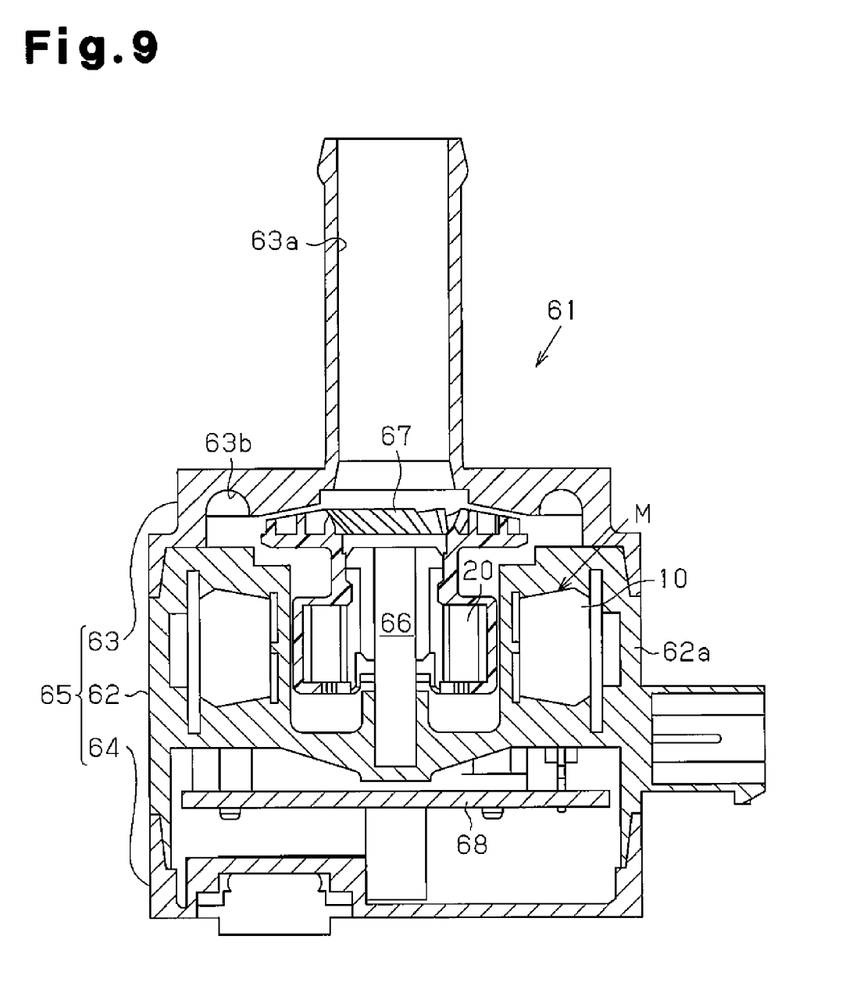
FIG. 9 is a schematic cross-sectional view of an electric pump using the motor of FIG. 1A.

Although not particularly mentioned in the foregoing description, the motor M of the above embodiment can be used as any driving device. For example, as shown in FIG. 9, the motor M may be applied to an electric pump 61 using a motor. In detail, the electric pump 61 is provided with a case 65 including a motor housing 62, a pump housing 63, and an end housing 64. The motor housing 62 is cylindrical and has a closed bottom. The pump housing 63 is fixed to the open end of the motor housing 62 and includes a suction port 63a and a discharge port 63b. The end housing 64 is fixed to the bottom outer side of the motor housing 62. The electric pump 61 includes the stator 10, the rotor 20, a shaft 66, and an impeller 67. The stator 10 is held in a cylindrical portion 62a of the motor housing 62. The shaft 66 is fixed to the bottom inner side of the motor housing 62. The rotor 20 is rotatably supported by the shaft 66. The impeller 67 rotates integrally with the rotor 20. Further, the electric pump 61 includes a control circuit substrate 68, which forms the controller 51 of the above embodiment and which is held in an accommodation compartment surrounded by the bottom outer side of the motor housing 62 and the end housing 64. The electric pump 61 can employ the sensorless driving technique in a satisfactory manner and the electric pump 61 can be miniaturized.

In the above embodiment, the motor M includes the twelve-slot stator 10, which has the twelve teeth 11a, and the eight-magnetic pole rotor 20, which has the four magnets 23. The structure of the motor M may be changed as long as the stator includes 3×n (where n is a natural number) slots, which has 3×n teeth and the rotor includes 2×n magnetic poles, which has n magnets.

For example, the motor M may include an eighteen-slot stator, which has eighteen teeth, and a twelve-magnetic pole rotor, which has six magnets. In this case, it is also preferred that $A=(6.10\times10^{-3}\times B^2-8.69\times10^{-1}\times B+1.14\times10^2)\pm8\%$ be satisfied.

The above embodiment is set to satisfy $A=(6.10\times10^{-3}\times B^2-8.69\times10^{-1}\times B+1.14\times10^2)\pm8\%$. Instead, for example, $A=(6.10\times10^{-3}\times B^2-8.69\times10^{-1}\times B+1.14\times10^2)\pm4\%$ may be satisfied.

This obtains a further stable waveform for the induced voltage and allows for employment of the sensorless driving technique in a further satisfactory manner thereby increasing efficiency.

Further, $A=(6.10\times10^3\times B^2-8.69\times10^{-1}\times B+1.14\times10^2)\pm8\%$ does not have to be satisfied, and the electrical angle (A) between the two ends of one of the magnetic poles (the magnetic poles of the magnets 23) may be smaller than the electrical angle (B) between the two ends of the other one of the magnetic poles (the magnetic poles of the salient poles 22b). This also obtains advantage (1) of the above embodiment.

The present examples and embodiments are to be considered as illustrative and not restrictive, and the invention is not to be limited to the details given herein, but may be modified within the scope and equivalence of the appended claims.

The invention claimed is:

1. A motor in which drive current supplied to a winding is controlled in accordance with a rotational position of a rotor detected from a waveform of an induced voltage between phases, the motor comprising:
   a stator including:
   3×n teeth, wherein the teeth are arranged in a circumferential direction and extend inward in a radial direction, and slots are formed between adjacent teeth in the circumferential direction; and
   windings associated with three phases such that each tooth is wound with a winding associated with one of the three phases; and
   a rotor including a rotor core, which is arranged inward in the radial direction from the stator, n number of magnets arranged in the circumferential direction of the rotor core, and n number of salient poles arranged in the rotor core, wherein the magnets function as first magnetic poles, the salient poles function as second magnetic poles, and each of the salient poles is spaced apart by a gap from the adjacent ones of the magnets in the circumferential direction, wherein
   an angular interval between the adjacent magnets is substantially the same as an angular interval between the teeth that are wound with windings associated with the same phase of the three phases,
   n is a natural number,
   the magnets and the gap are arranged inward in the radial direction from an outer contour of the rotor core, and
   an electrical angle between two ends of each magnet is set to be smaller than an electrical angle between two ends of each salient pole and set so as to prevent the waveform of the induced voltage from being asymmetric relative to each peak.

2. The motor according to claim 1, wherein when the electrical angle between two ends of each magnet is represented by A and the electrical angle between two ends of each salient pole is represented by B, the two electric angles are set to satisfy $0.92 \leq A/(6.10 \times 10-3 \times B2-8.69 \times 10-1 \times B+1.14 \times 102) \leq 1.08$.

3. The motor according to claim 2, wherein
the number of the slots is twelve,
the total number of magnetic poles is eight,
a mechanical angle between the two ends of each magnet is set to 27°, and
a mechanical angle between the two ends of each salient pole is set to 33°.

4. An electric pump comprising:
the motor according to claim 1;
a case that accommodates the motor; and
an impeller rotated integrally with the rotor in the case.

* * * * *